United States Patent

Sollner

(10) Patent No.: US 7,505,361 B2
(45) Date of Patent: Mar. 17, 2009

(54) METHOD FOR PREDICTION OF SURFACE RELATED MULTIPLES FROM MARINE TOWED DUAL SENSOR SEISMIC STREAMER DATA

(75) Inventor: Walter Sollner, Oslo (NO)

(73) Assignee: PGS Geophysical AS, Lysaker (NO)

( * ) Notice: Subject to any disclaimer, the term of this patent is extended or adjusted under 35 U.S.C. 154(b) by 121 days.

(21) Appl. No.: 11/825,989

(22) Filed: Jul. 10, 2007

(65) Prior Publication Data

US 2008/0253227 A1    Oct. 16, 2008

Related U.S. Application Data

(60) Provisional application No. 60/922,796, filed on Apr. 11, 2007.

(51) Int. Cl.
  *G01V 1/38*    (2006.01)
(52) U.S. Cl. .............. 367/24; 367/15; 367/21
(58) Field of Classification Search ........... 367/24, 367/15, 21
  See application file for complete search history.

(56) References Cited

U.S. PATENT DOCUMENTS

| | | | |
|---|---|---|---|
| 4,611,312 A * | 9/1986 | Ikeda ........................... | 367/38 |
| 5,051,961 A | 9/1991 | Corrigan et al. | |
| H1529 H | 5/1996 | Schneider, Jr. et al. | |
| 6,704,244 B1 | 3/2004 | Vaage | |
| 6,894,948 B2 * | 5/2005 | Brittan et al. ................. | 367/24 |
| 7,336,561 B2 * | 2/2008 | Borresen ...................... | 367/24 |
| 2006/0050611 A1 | 3/2006 | Børrensen | |
| 2006/0250890 A1 | 11/2006 | Van den Berg et al. | |

OTHER PUBLICATIONS

Eurasian Intellectual Property Office, Examiner T. Vladimirova, Search Report, Jul. 31, 2008.
Lasse Amundsen, Arne Reitan, "Decomposition of multicomponent sea-floor data into upgoing and downgoing P- and S-waves", Mar.-Apr. 1995, Geophysics, vol. 60, No. 2, pp. 563-572.
Luc T. Ikelle, Lasse Amundsen, Anthony Gangi, Steven B. Wyatt, "Kirchhoff scattering series: Insight into the multiple attenuation method", Jan.-Feb. 2003, Geophysics, vol. 68, No. 1, pp. 16-28.
Lasse Amundsen, "Elimination of free-surface related multiples without need of the source wavelet", Jan.-Feb. 2001, Geophysics, vol. 66, No. 1, pp. 327-341.
Walter Sollner, Martin Widmaier, 2000, 70$^{th}$ Ann. Int'l Mtg. SEG, Expanded Abstracts, pp. 2001-2004.

* cited by examiner

*Primary Examiner*—Derris H Banks
*Assistant Examiner*—Krystine Saito
(74) *Attorney, Agent, or Firm*—E. Eugene Thigpen; Charles R. Schweppe

(57) ABSTRACT

Particle motion sensor signals and the pressure sensor signals data from a towed marine seismic streamer are combined to generate an up-going pressure wavefield component and a down-going particle motion wavefield component. The down-going particle motion wavefield component is extrapolated from the receiver position depth level to the source position depth level. The up-going pressure wavefield component is multiplied by the extrapolated down-going particle motion wavefield component, generating a first product. Then, $n^{th}$ order surface related multiples in the pressure wavefield are iteratively calculated utilizing a product of $(n-1)^{th}$ surface related multiple free data and the extrapolated down-going particle motion wavefield component. The calculated $n^{th}$ order surface related multiples are iteratively subtracted from the recorded pressure wavefield, generating the $n^{th}$ order surface related multiple free data.

6 Claims, 4 Drawing Sheets

METHOD FOR PREDICTION OF SURFACE RELATED MULTIPLES FROM MARINE TOWED DUAL SENSOR SEISMIC STREAMER DATA

CROSS-REFERENCES TO RELATED APPLICATIONS

This application claims priority under 35 U.S.C. 119(e) to U.S. Provisional Application Ser. No. 60/922,796, filed on Apr. 11, 2007, entitled "Method for Prediction of Surface Related Multiples from Marine Towed Streamer Data by Proper Handling of the Sea Surface Variation and Reflection Coefficient Fluctuation", the disclosure of which is incorporated herein by reference in its entirety.

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting and particularly to the field of marine seismic data processing. More particularly, the invention relates to multiple attenuation in dual sensor towed marine seismic streamers.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downwardly into the subsurface of the earth. In a marine seismic survey, the seismic signal will first travel downwardly through a body of water overlying the subsurface of the earth.

Seismic energy sources are used to generate the seismic signal which, after propagating into the earth, is at least partially reflected by subsurface seismic reflectors. Such seismic reflectors typically are interfaces between subterranean formations having different elastic properties, specifically wave velocity and rock density, which lead to differences in acoustic impedance at the interfaces. The reflections are detected by seismic sensors (also called receivers) at or near the surface of the earth, in an overlying body of water, or at known depths in boreholes. The resulting seismic data is recorded and processed to yield information relating to the geologic structure and properties of the subterranean formations and their potential hydrocarbon content.

Appropriate energy sources for seismic surveys may include explosives or vibrators on land and air guns or marine vibrators in water. Appropriate types of seismic sensors may include particle motion sensors in land surveys and water pressure sensors in marine surveys. Particle motion sensors are typically particle velocity sensors, but particle displacement, particle acceleration sensors, or pressure gradient sensors may be used instead of particle velocity sensors. Particle velocity sensors are commonly known in the art as geophones and water pressure sensors are commonly known in the art as hydrophones. Both seismic sources and seismic sensors may be deployed by themselves or, more commonly, in arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle velocity sensors such as geophones or particle acceleration sensors such as accelerometers, in addition to hydrophones. The pressure sensors and particle motion sensors may be deployed in close proximity, collocated in pairs or pairs of arrays along a seismic cable.

Recorded seismic data contains signal in terms of the useful primary reflections ("primaries") as well as noise, such as multiple reflections ("multiples"). Primaries are single reflections from subsurface seismic reflectors of interest, while multiples are multiple reflections from any combination of reflectors. Multiples are especially strong relative to primaries in marine seismic surveys, because the water-earth and, particularly, the air-water interfaces are strong seismic reflectors due to their high acoustic impedance contrasts. Surface related multiple reflections, in particular, are those multiples that have at least one downward reflection at the free surface (water-air contact). The number of downward reflections at the surface defines the order of the surface related multiples. Under this definition, primaries are just zero order surface related multiples. Thus, a method is desired that removes first and higher order surface related multiples.

Many of the conventional methods apply seismic processing to pressure sensors only. However, the pressure sensor data has spectral notches caused by the water surface reflections, commonly referred to as sea surface ghosts. These spectral notches are often in the seismic acquisition frequency band. Thus, the usable portion of the pressure sensor data is frequency band limited away from the spectral notches and cannot cover the entire seismic acquisition frequency band. This limitation can be avoided by using both pressure sensors and particle motion sensors in a "dual sensor" streamer.

L. Amundsen and A. Reitan, in their article "Decomposition of multicomponent sea-floor data into upgoing and downgoing P- and S-waves", *Geophysics*, Vol. 60, No. 2, March-April, 1995, p. 563-572, describe a method for deghosting dual sensor cable data in the water layer and on the sea floor. Amundsen and Reitan construct a decomposition filter to apply to pressure recorded by hydrophones just above the sea floor and the radial and vertical components of the particle velocity recorded by geophones just below the sea floor. The decomposition filter separates the data into upgoing and downgoing P- and S-waves, yielding the deghosted wavefield in the up-going components. The decomposition filter coefficients depend upon the P- and S-wave velocities and the density at the sea floor.

Borresen, C. N., in U.S. Patent Publication No. US 2006/0050611 A1, entitled "System for Attenuation of Water Bottom Multiples in Seismic Data Recorded by Pressure Sensors and Particle Motion Sensors", assigned to an affiliated company of the assignee of the present invention, describes a method for attenuation of water bottom multiples in marine seismic data. The method includes calculating up-going and down-going wavefield components from pressure sensor and particle motion sensor signals, extrapolating the wavefields to the water bottom, and utilizing the extrapolated wavefields and a water bottom reflection coefficient to generate an up-going wavefield substantially without water bottom multiples.

Ikelle, L. T., et al., in their article, "Kirchhoff scattering series: Insight into the multiple attenuation method", *Geophysics*, Vol. 68, No. 1, January-February, 2003, p. 16-28, describe a Kirchhoff scattering series for attenuating surface related multiples in towed streamer data. Ikelle et al. (2003), show how the Kirchhoff series approach with both pressure and vertical velocity measurements is similar to a Born series approach with just pressure measurements.

Tools for surface related multiple suppression have included adaptive subtraction methods based on feedback theory, methods based on the reciprocity theorem, and the inverse scattering derivation methods. All these tools, although based on different theoretical derivations, do not require any knowledge of the underlying subsurface model. In addition, some do also not require knowledge of the source signature. Other methods are also known in the art for suppression of surface related multiples. These methods are commonly known as SRME (Surface Related Multiple Elimination). These are essentially data driven methods, which means that the multiples are predicted from the measured data without knowledge of the subsurface earth model. However, some of these methods require knowledge of the source signature.

However, a common drawback of these methods, as applied to conventional towed streamer data, is the error caused by variation in the sea surface depth and fluctuations in the sea surface reflection coefficient, in addition to streamer feathering and receiver ghosts. These problems are worsened by bad weather conditions, which adversely affect the sea surface. Knowledge of the sea surface and reflection coefficient would allow some correcting of the multiple prediction errors. Thus, a need exists for a method of SRME which effectively attenuates the multiples even in harsh weather conditions.

BRIEF SUMMARY OF THE INVENTION

The invention is a method for processing seismic data from dual sensor towed marine seismic streamers having particle motion sensors and pressure sensors. Particle motion sensor signals and the pressure sensor signals data from a towed marine seismic streamer are combined to generate an up-going pressure wavefield component and a down-going particle motion wavefield component. The down-going particle motion wavefield component is extrapolated from the receiver position depth level to the source position depth level. The up-going pressure wavefield component is convolved (multiplied in frequency domain) with the extrapolated down-going particle motion wavefield component, generating the first-order surface related pressure field multiples. Then, $n^{th}$ order surface related multiples in the pressure wavefield are iteratively calculated utilizing a product of $(n-1)^{th}$ surface related multiple free pressure data and the extrapolated down-going particle motion wavefield component. The calculated $n^{th}$ order surface related multiples are iteratively subtracted from the recorded pressure wavefield, generating the $n^{th}$ order surface related multiple free data.

BRIEF DESCRIPTION OF THE DRAWINGS

The invention and its advantages may be more easily understood by reference to the following detailed description and the attached drawings, in which.

Figure 1:
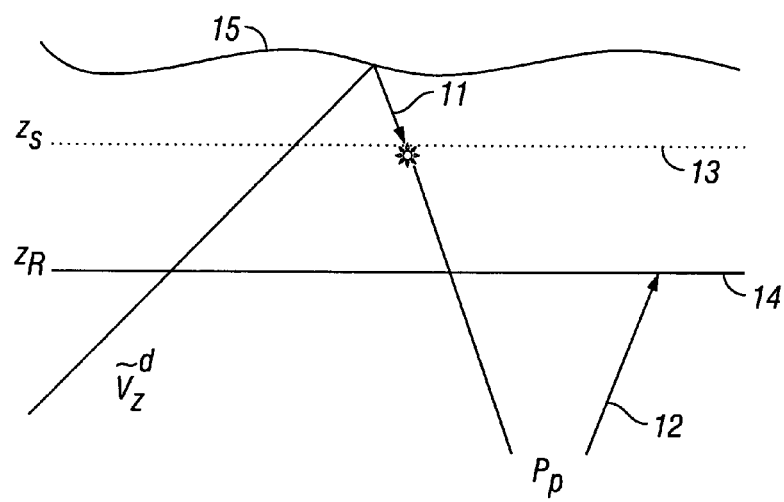
FIG. 1 is a schematic diagram of the two ray-legs indicating the vertical velocity field and the pressure field as used in the method of the invention.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for processing dual sensor seismic data acquired by towed streamers during a marine seismic survey. In particular, the invention is a method for attenuating surface related multiples from the pressure and particle motion sensor signals in the dual sensor data. Particle motion sensors are typically particle velocity sensors, but other particle motion sensors, including particle acceleration sensors, may be used instead of particle velocity sensors in dual sensor streamers. Particle velocity sensors are commonly known in the art as geophones and particle acceleration sensors are commonly known in the art as accelerometers. The present invention will be described with embodiments employing geophones, but this sensor choice is for simplicity of illustration only and is not intended to be a restriction of the invention.

Taking advantage of dual sensor data from dual sensor towed streamer acquisition, the method of the invention is a multiple prediction approach utilizing both the down-going vertical velocity field and the up-going pressure field. This approach handles the sea surface variations implicitly and may reduce bad weather caused acquisition downtime. A dual sensor towed streamer simultaneously senses the pressure field with hydrophones and the vertical particle velocity field with geophones, at the same spatial position. The acquired wavefields may then be separated at the receiver depth level into up-going and down-going pressure wavefield components and up-going and down-going vertical velocity wavefield components by angle dependent dual sensor subtraction and summation techniques, described below. The sea surface effects are present in the surface related multiples, since these multiples have, by definition, at least one down-going reflection at the free-surface. However the up-going primaries are free of surface effects. Thus, the separated wavefield components can be adequately combined to include the surface effect in the multiple prediction step. As another consequence of the wavefield separation (e.g., deghosting), the cable may be towed more deeply (typically around 15 m) to assure minimal noise effects from the weather swell. Based on a towed dual sensor streamer comprising pressure and vertical velocity sensors, the method of the invention is a purely data driven surface related multiple prediction and suppression approach, which effectively handles sea surface variations.

In one embodiment, signals detected by the particle motion sensors are scaled to match signals detected by the pressure sensors. The pressure sensor signals and the scaled particle motion sensor signals are combined to generate up-going and down-going pressure wavefield components and up-going and down-going vertical particle velocity components. The down-going vertical velocity wavefield is backward extrapolated from the receiver depth level to the source depth level and convolved with the up-going pressure in order to predict in a first iteration the surface related multiples of the pressure wavefield. The down-going velocity field is thereby sorted in common source gathers and the up-going pressure field is sorted in common receiver gathers. The predicted first iteration surface related multiples are in a later processing step subtracted from the up-going pressure field, preferably in a least square sense, as commonly known in the art.

In order to clarify which of the four separated wavefields need to be combined in the Surface Related Multiple Elimination (SRME) process in the method of the invention, the standard SRME expression is considered in the angular frequency domain:

$$p(x_r, \omega; x_s) = \qquad (1)$$
$$p_p(x_r, \omega; x_s) - \frac{i\omega}{s(\omega)} \int dS(\chi) p_p(\chi, 0, \omega; x_r) v_z(\chi, 0, \omega; x_s).$$

Here, $x_r=(x_r, y_r, z_r)$ is the receiver position in Cartesian coordinates $x=(x, y, z)=(\chi, z)$, $x_s=(x_s, y_s, z_s)$ is the source position, and $s(\omega)$ is the source signature at $x_s$. The first expression on the right hand side of Equation (1), $p_p(x_r, \omega, x_s)$, is the temporal 1D Fourier transform of the desired pressure field without the surface related multiples (or source and receiver ghosts) that would be measured at a receiver at $x_r$ and from a point source at $x_s$ in a hypothetic medium without the water-air surface. The expression on the left side of Equation (1), $p(x_r, \omega, x_s)$, is the recorded pressure data, as recorded by a hydrophone in the actual medium with the water-air surface present. The first term of the integrant in Equation (1) is the multiple-free pressure field, $p_p(\chi, 0, \omega, x_r)$, at the free surface z=0 (water surface) and at the horizontal position $\chi=(x, y)$, after being sorted into common receiver gathers. This pressure field is multiplied in the space-frequency domain by the vertical velocity field, $v_z(\chi, 0, \omega, x_s)$, which is again at the surface z=0, after being sorted into common source gathers.

Both fields of the integrant in Equation (1) have to be related to measured quantities at the receiver level $z=z_r$, before the integral equation can be solved. The first term is commonly obtained in SRME processes by extrapolating the deghosted pressure data to the surface z=0. Thus, the pressure field would be extrapolated in a common receiver domain on the source side from the source level $z=z_s$ to the surface z=0. For the second term in the integrand in Equation (1), the vertical velocity term, one can either forward extrapolate the up-going vertical velocity field $v_z^u$ or backward extrapolate the down-going vertical velocity field $v_z^d$ from the receiver level $z=z_r$ to the free surface z=0. The up-going and down-going components of the vertical velocity field are equal at the free surface, since the pressure field vanishes at the water surface. The method of the invention utilizes the down-going vertical velocity field, in contrast to Ikelle et al. (2003), discussed above, because this choice implicitly includes the sea surface effects into the free-surface multiple prediction. The standard SRME formula in Equation (1) can now be expressed as:

$$p(x_r, \omega; x_s) = \qquad (2)$$
$$p_p(x_r, \omega; x_s) - \frac{i\omega}{s(\omega)} \int dS(\chi) p_p(\chi, z_s, \omega; x_r) \tilde{v}_z^d(\chi, z_s, \omega; x_s),$$

where $$\tilde{v}_z^d(\chi, z_s, \omega; x_s) = \int_{-\infty}^{+\infty} dk v_z^d(k, z_r, \omega; x_s) \exp\{-ik_z(z_r - z_s)\} \exp\{ik\chi\} \qquad (3)$$

in which $v_z^d(k, z_r, \omega, x_s)$ is the 2D (temporal and spatial) Fourier transform of the down-going vertical velocity wavefield component in the frequency-wavenumber domain and $k=(k_x, k_y)$ are the horizontal wavenumbers in the x and y directions.

The first exponential term, $\exp\{-ik_z(z_R-z_s)\}$, in the integrand in Equation (3) is an extrapolation operator which represents in one step the total backward-extrapolation of the down-going velocity field from the receiver level to the source level. Alternatively, this same extrapolation term may be split into two terms for a mathematically equivalent interpretation. The term $\exp\{-ik_z z_r\}$ in the extrapolation operator now relates to the backward extrapolation of the down-going velocity field $v_z^d$ from the receiver level $z=z_r$ to the free surface z=0, only. The term $\exp\{ik_z z_s\}$ in the extrapolation operator now relates to the forward extrapolation of the up-going pressure field $p^u$ from the source level $z=z_s$ to the surface z=0. Note that the backward extrapolation of the down-going velocity field would contain an additional term to compensate for the field discontinuity by crossing the source level, if the data would also contain the direct wavefield. In either case, the down-going velocity field implicitly brings the sea surface effects into the prediction step. The extrapolation operator in Equation (3) needs only the distance between the source and the receiver depth level, $(z_r-z_s)$. Hence, the multiple prediction of the invention does not require any knowledge of the sea surface and handles the different depth levels between source and receiver.

The second exponential term, $\exp\{ik\chi\}$, in Equation (3) is the transformation kernel of the inverse spatial 2D Fourier transform of the down-going vertical velocity field $v_z^d$ from the wavenumber-frequency domain (k, z, ω) to the space-frequency domain ($\chi$, z, ω). The sign used in the kernel defines the sign convention of the extrapolation directions, as described above. The separation of the vertical velocity wavefield into up-going and down-going components, such as the down-going vertical velocity $v_z^d$ utilized in Equations (2) and (3), is often calculated in the wavenumber-frequency domain and will be described below in more detail to illustrate the method of the invention.

FIG. 1 shows a schematic diagram of the two ray-legs indicating the vertical velocity wavefield 11 and the pressure wavefield 12 as used in the multiple prediction mode and described in Equations (2) and (3) above. The wavefield rays are shown in relation to the source depth level 13, the receiver depth level 14, and the water surface 15.

Similar to classical SRME approaches, the Kirchhoff scattering series is next built from a Taylor series expansion of Equation (2) to obtain the surface related multiple-free pressure wavefield $p_p$:

$$p_p(x_r, \omega; x_s) = p(x_r, \omega; x_s) - p_1(x_r, \omega; x_s) + p_2(x_r, \omega; x_s) - \quad (4)$$

where p is the recorded pressure data, $p_1$ contains the first-order multiples being removed, $p_2$ contains the second-order multiples being removed, and so on, iteratively. The $n^{th}$-order surface related multiple prediction $p_n$ is obtained in this iterative method by replacing the surface related multiple free pressure wavefield $p_p$ from the integrant in Equations (2) and (3) by the pressure wavefield $p_{n-1}$ with $(n-1)^{th}$-order multiples already removed, as given by:

$$p_n(x_r, \omega; x_s) = -\frac{i\omega}{s(\omega)} \int dS(\chi) p_{n-1}(\chi, z_s, \omega; x_r) \bar{v}_z^d(\chi, z_s, \omega; x_s). \quad (5)$$

The first-order multiple prediction in Equation (5) uses the up-going pressure field of the original data together with down-going velocity filed of the original data extrapolated from the receiver level to the source level. That this method of the invention needs two data sets from two different recordings is the main difference from operational point of view to procedures based on the feedback theory or on the inverse scattering theory. The latter prior approaches predict the multiples solely from the pressure field. Use of the vertical velocity field introduces the previously-mentioned surface effects into the multiples prediction. Further, use of the vertical velocity field also introduces a needed angle dependent scaling, which can not be easily compensated for in the other types of approach, even by the use of adaptive subtraction.

The following discussion describes an example method for separating the wavefields into up-going and down-going components. Wavefields, such as the pressure wavefield p and the vertical velocity wavefield $v_z$, comprise an up-going wavefield component and a down-going wavefield component. For example, the pressure wavefield p comprises an up-going wavefield component $p^u$ and a down-going wavefield component $p^d$, expressed as:

$$p = p^u + p^d. \quad (6)$$

The subscripts u and d designate up-going and down-going travel directions, respectively, of wavefields at any location. Similarly, the vertical velocity field $v_z$ comprises an up-going wavefield component $v_z^u$ and a down-going wavefield component $v_z^d$, expressed as:

$$v_z = v_z^u - v_z^d. \quad (7)$$

A particle motion sensor such as a geophone has directional sensitivity (with positive deflection in the vertical +z direction, by convention) whereas a pressure sensor such as a hydrophone does not. A pressure sensor is omni-directional. The water/air interface at a water surface is an excellent reflector of seismic waves and so the reflection coefficient at the water surface is nearly unity in magnitude and negative in sign for pressure signals. Thus, the downwardly propagating wavefields reflected from the water surface will be phase-shifted 180° relative to the upwardly propagating wavefields. Accordingly, the up-going wavefield signal components detected by a geophone and a hydrophone located close together will be recorded 180° out of phase, while the down-going wavefield signal components will be recorded in phase.

In an alternative sign convention, not used in this illustration of the invention, the up-going wavefield signal components would be recorded in phase, while the down-going wavefield signal components would be recorded 180° out of phase.

While a hydrophone records the total wavefield omni-directionally, a vertical geophone, as typically utilized in seismic processing, only records the vertical component of the wavefield uni-directionally. The vertical component of the wavefield will only be equal to the total wavefield for signals that happen to be propagating vertically downward. If θ is the angle of incidence between the signal wave front and the sensor orientation, then vertical upward propagation is conventionally defined by incidence angle θ=0.

Thus, in the method of the invention, the recorded signal $v_z$ of a vertical geophone, a plane wave with incidence angle θ, needs to be adjusted to the recorded signal of a geophone detecting the total wavefield and then, to further be adjusted to match the recorded pressure wavefield p of a hydrophone. This adjustment is made in the method of the invention by scaling the vertical geophone signal $v_z$ by an appropriate amplitude scaling function, such as the following w in the space-time domain:

$$w = \frac{\rho c}{\cos(\theta)}. \quad (8)$$

Here, the factor ρc is the acoustic impedance of water, where ρ is the density of water and c is the acoustic velocity of water. In the space-time domain, the angle-dependent amplitude scaling function w is a multi-channel filter that transforms the unidirectional vertical velocity wavefield of the geophone recording $v_z$ into an omni-directional pressure wavefield p.

In the frequency-wavenumber domain, the amplitude scaling function $w_1$ for the vertical velocity wavefield $v_z$ can be expressed as:

$$w_1 = \frac{\rho \omega}{k_z}, \quad (9)$$

where $$k_z = \sqrt{\frac{\omega^2}{c^2} - k_x^2 - k_y^2} \quad (10)$$

is the vertical wavenumber, ω=2πf is the angular frequency for frequency f, and $k_x$ and $k_y$ are the horizontal wavenumbers in two orthogonal horizontal directions. Typically, the two horizontal directions would be chosen in the in-line and cross-line directions of the marine seismic survey.

Alternatively, in the plane-wave domain, the amplitude scaling function $\tilde{w}_1$ for the vertical velocity wavefield $v_z$ can also be expressed as:

$$\tilde{w}_1 = \frac{\rho}{p_z}, \quad (11)$$

where $$p_z = \sqrt{\frac{1}{c^2} - p_x^2 - p_y^2} \quad (12)$$

is the vertical slowness and $p_x$ and $p_y$ are the horizontal slownesses in two orthogonal horizontal directions.

In other alternative embodiments, the amplitude scaling function can be obtained as a spatial filter in the space-time domain by applying an inverse Fourier transform to the frequency-wavenumber domain representation $w_1$ of the amplitude scaling function from Equation (9) or by applying an inverse Radon transform to the plane-wave representation $\tilde{w}_1$ of the amplitude scaling function from Equation (11). The choice of domain is not intended to be a limitation of the invention, but merely for simplicity of illustration.

The total pressure wavefield p, such as recorded by a hydrophone at the streamer sensor position, is the sum of an up-going pressure wavefield component $p^u$ and a down-going pressure wavefield component $p^d$ at the sensor position, as shown in Equation (6) above. The vertical velocity wavefield $v_z$, such as recorded by a geophone at the streamer sensor position, and after scaling by the (negative of the) amplitude scaling factor $-w_1$ to act as a pressure wavefield, is the difference of the up-going pressure wavefield component $p^u$ and the down-going pressure wavefield component $p^d$ at the sensor position, as represented in the frequency-wavenumber domain by:

$$-w_1 v_z = p^u - p^d. \qquad (13)$$

Similarly, an amplitude scaling factor $w_2$, such as the inverse of $w_1$, may be applied to the pressure wavefield p to transform it to act as a vertical velocity wavefield. Then, the total vertical velocity wavefield $v_z$, as recorded by a geophone at the streamer sensor position, is the difference of an up-going vertical velocity wavefield component $v_z^u$ and a down-going vertical velocity wavefield component $v_z^d$ at the sensor position, as shown in Equation (7). Similarly, as in Equation (13), the pressure wavefield p, as recorded by a hydrophone at the streamer sensor position, and after scaling by the amplitude scaling factor $-w_2$ to act as a vertical velocity wavefield, is the sum of the up-going vertical velocity wavefield component $v_z^u$ and the down-going vertical velocity wavefield component $v_z^d$ at the sensor position, as represented in the frequency-wavenumber domain by:

$$-w_2 p = v_z^u + v_z^d. \qquad (14)$$

Combining Equations (6) and (13) yields a method for calculating the up-going pressure wavefield component $p^u$ and the down-going pressure wavefield component $p^d$ at the sensor position in terms of the pressure wavefield p and the scaled vertical particle velocity wavefield $w_1 v_z$, as represented in the frequency-wavenumber domain by:

$$p^u = \frac{p - w_1 v_z}{2} \qquad (15)$$

and $$p^d = \frac{p + w_1 v_z}{2}. \qquad (16)$$

Similarly, combining Equations (7) and (14) yields a method for calculating the up-going vertical velocity wavefield component $v_z^u$ and the down-going vertical velocity wavefield component $v_z^d$ at the sensor position in terms of the vertical particle velocity wavefield $v_z$ and the scaled pressure wavefield $w_2 p$, as represented in the frequency-wavenumber domain by:

$$v_z^u = \frac{v_z - w_2 p}{2} \qquad (17)$$

and $$-v_z^d = \frac{v_z + w_2 p}{2}. \qquad (18)$$

Figure 5:
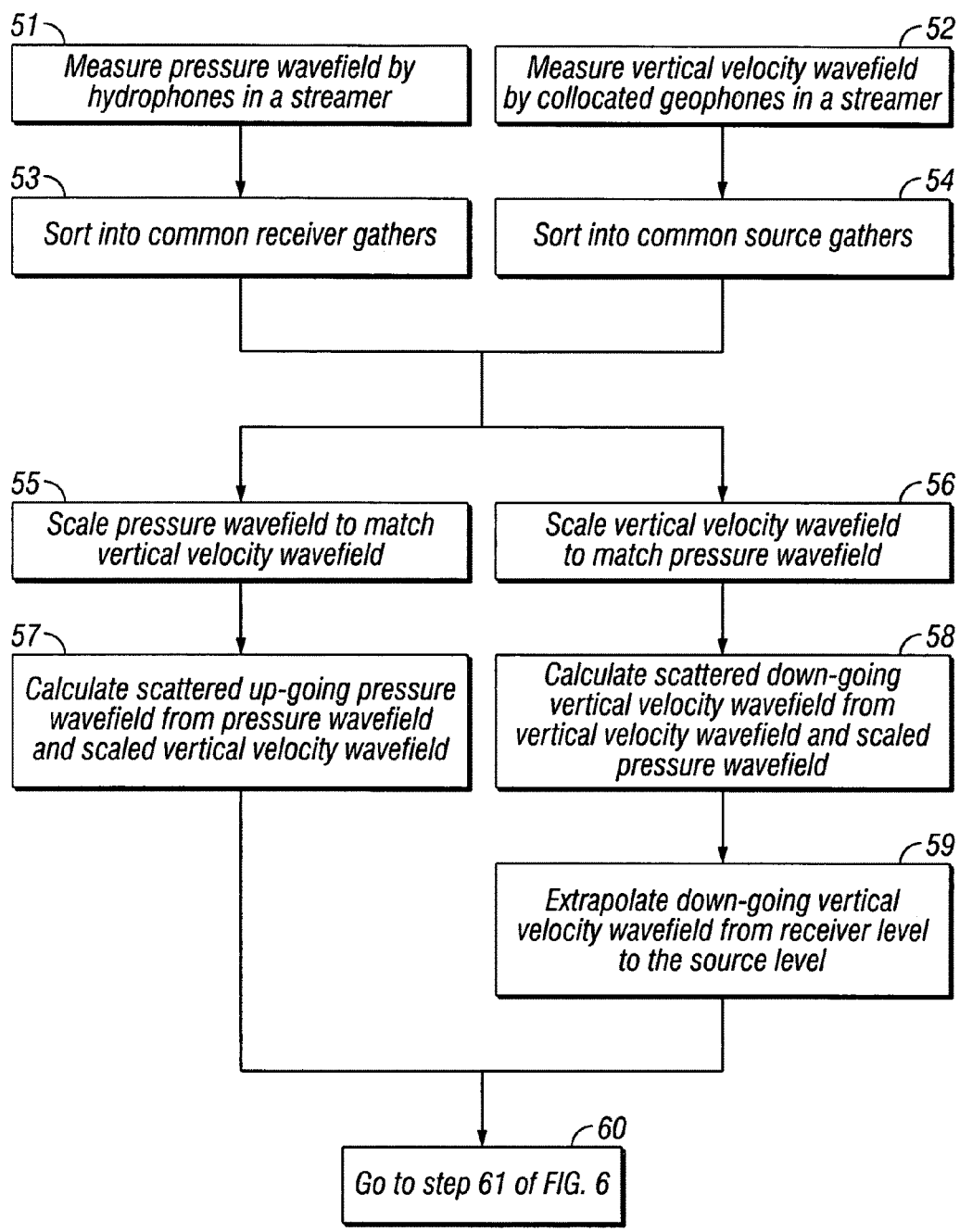
FIG. 5 is a flowchart illustrating the beginning steps of an embodiment of the method of the invention for attenuation of surface related multiples from seismic data recorded by pressure sensors and particle motion sensors in marine towed streamers.
Figure 6:
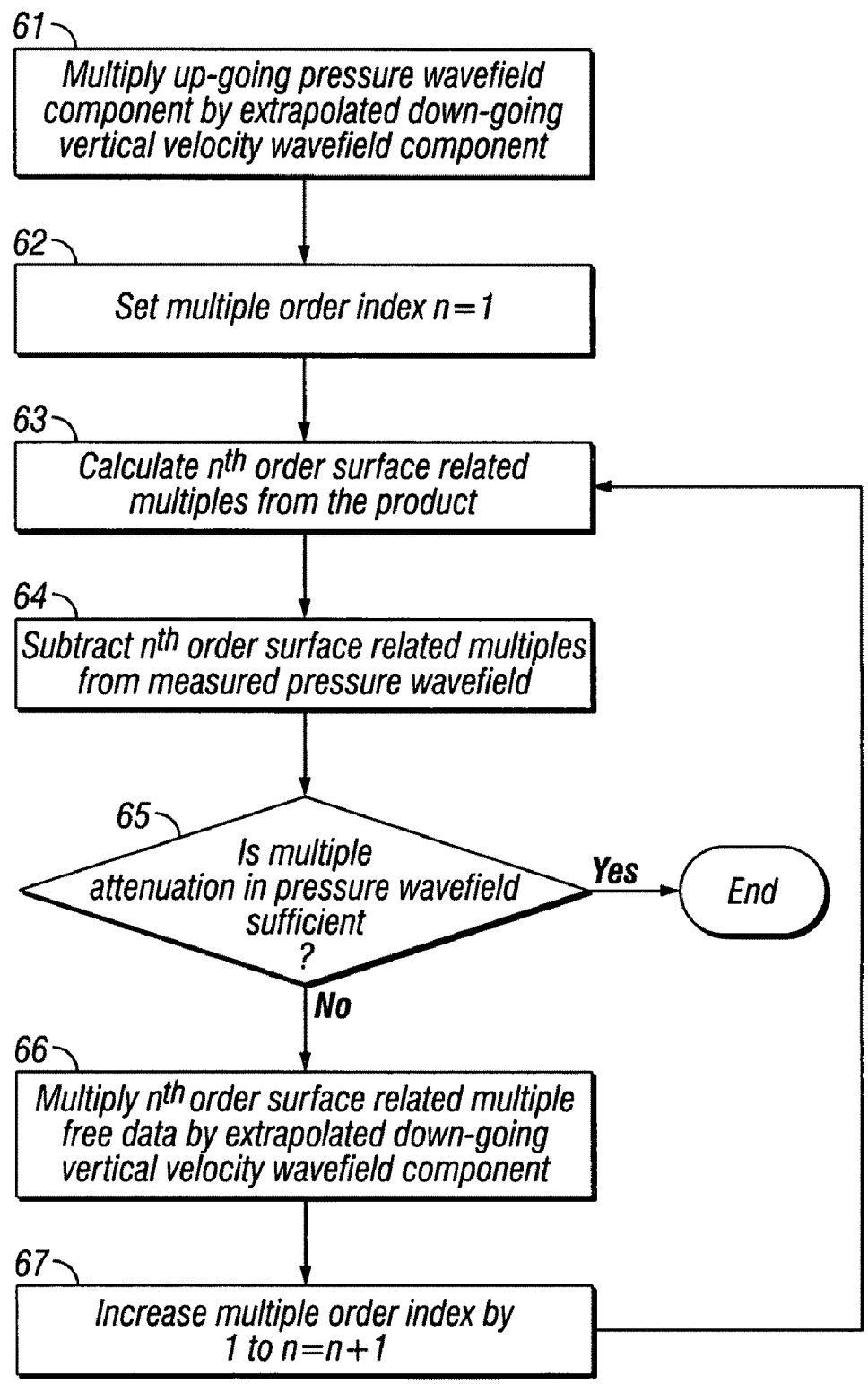
FIG. 6 is a flowchart illustrating the ending steps of the embodiment of the method of the invention started in FIG. 5.

FIGS. 5 and 6 are flowcharts illustrating the steps of an embodiment of the method of the invention for attenuation of surface related multiples from seismic data recorded by pressure sensors and particle motion sensors in marine towed streamers. FIG. 5 shows the beginning steps of the method and FIG. 6 shows the ending steps of the method.

At step 51, a measurement of a pressure wavefield is obtained from a pressure sensor, such as a hydrophone, in a towed marine seismic streamer. For illustrative purposes only, the pressure measurement will be referred to as a hydrophone signal.

At step 52, a measurement of a vertical velocity wavefield is obtained from a vertical velocity sensor, such as a vertical geophone, at a location adjacent the hydrophone from step 51 in the towed marine seismic streamer. For illustrative purposes only, the vertical velocity measurement will be referred to as a geophone signal.

At step 53, the pressure wavefield data from step 51 is sorted into common receiver gathers.

At step 54, the vertical velocity wavefield data from step 52 is sorted into common source gathers.

At step 55, the vertical velocity sensor signal from step 52 is scaled to correct for relative differences in the amplitudes of pressure and vertical velocity wavefield measurements. An angle-dependent amplitude scaling function is selected to transform the unidirectional vertical velocity wavefield of the geophone signal into an omni-directional pressure wavefield as in the hydrophone signal from step 53. The amplitude scaling function is described above in the discussion with regard to Equations (8) to (12).

At step 56, the pressure sensor signal from step 52 is scaled to correct for relative differences in the amplitudes of pressure and vertical velocity wavefield measurements. An angle-dependent amplitude scaling function is selected to transform the omni-directional pressure wavefield as in the hydrophone signal into an unidirectional vertical velocity wavefield of the geophone signal from step 54.

At step 57, an up-going pressure wavefield component at the streamer sensor position is calculated from a difference of the pressure sensor signal from step 53 and the scaled vertical velocity sensor signal from step 56. The calculation of the scattered up-going pressure wavefield component is preferably as given in Equation (15), above. This calculation is accompanied by first muting the wavefield that is directly incident from the source.

At step 58, a down-going vertical velocity wavefield component at the sensor position is calculated from a sum of the vertical velocity sensor signal from step 54 and the scaled pressure sensor signal from step 55. The calculation of the down-going scattered vertical velocity wavefield component is preferably as given in Equation (18), above. This calculation is accompanied by first muting the wavefield that is directly incident from the source.

At step 59, the down-going vertical velocity wavefield component at the sensor position from step 58 is extrapolated backward in time from a depth level at the sensor position up in space to a depth level of the source position. The extrapolation of the down-going vertical velocity wavefield component preferably takes place as described in the discussion of Equation (3), above.

At step 60, the process goes to step 61 of the flowchart in FIG. 6 to continue this procedure.

At step 61 of FIG. 6, the up-going pressure wavefield component from step 57 of FIG. 5 is multiplied in the space-frequency domain by the extrapolated down-going vertical velocity wavefield component from step 59 of FIG. 5, generating a product.

At step 62, a multiple order index n is set equal to 1.

At step 63, $n^{th}$ order surface related multiples is calculated utilizing the product. If n=1, then the product is from step 61. If n>1, then the product is from step 66 below. The calculation of the $n^{th}$ order surface related multiples is preferably done by applying Equation (5) with the product as the integrand, as discussed above.

At step 64, the $n^{th}$ order surface related multiples calculated in step 63 is subtracted from the measured pressure wavefield from step 51 of FIG. 5, generating $n^{th}$-order surface related multiple free data. The subtraction is preferably an adaptive subtraction, preferably accomplished by a least squares procedure. This subtraction will be done iteratively for successive orders of surface related multiples, as illustrated in Equation (4), above.

At step 65, it is determined if multiple attenuation in the pressure wavefield obtained in step 64 is sufficient. If so, then the iterative process ends. If not, then continue to step 66.

At step 66, the $n^{th}$-order surface related multiple free data obtained in step 64 is multiplied by the extrapolated down-going vertical velocity wavefield component from step 59 of FIG. 5, generating the product.

At step 67, the multiple order index n is increased by 1 to n+1. Next, the process returns to step 63 to iteratively repeat steps 63 through 66 to obtain higher order-surface related multiple free data to subtract until multiple attenuation is sufficient.

The following is an example that illustrates the advantages of the invention. In early summer of 2005 a test marine seismic survey was acquired using, simultaneously, a single conventional steamer towed at a nominal depth of 8 meters and a dual sensor streamer towed at a depth of 15 meters. The conventional streamer data was processed based on a relatively simple processing sequence by keeping thoroughly in mind not to violate wavefield presuppositions. The dual sensor streamer data was first decomposed into up- and down-going scattered pressure and vertical velocity fields. Subsequently the same processing sequence as used in the conventional streamer processing was applied on the individual decomposed wavefields for comparison.

Figure 2:
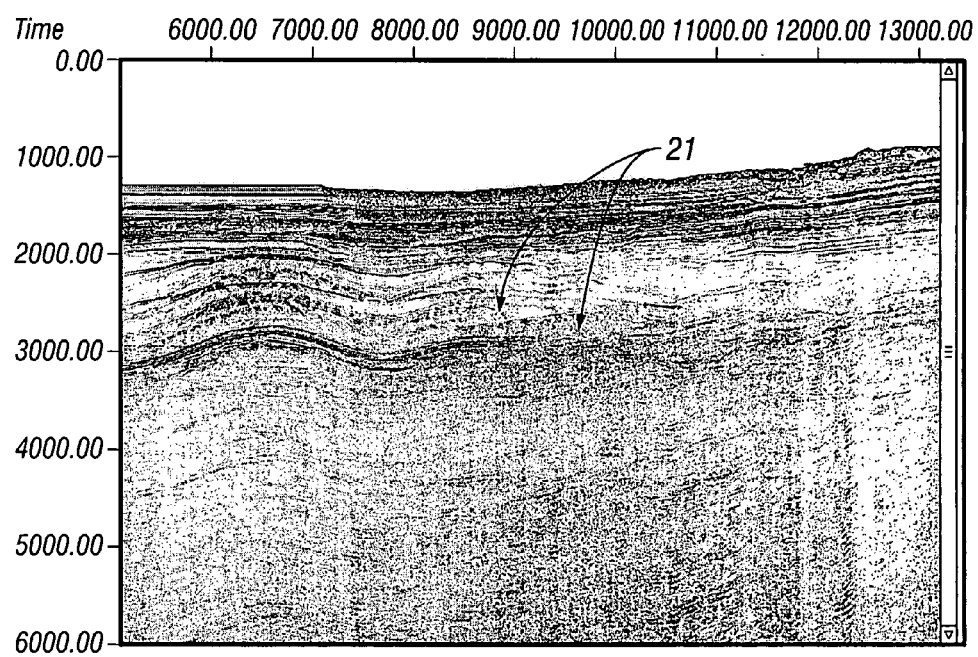
FIG. 2 is a NMO stack of the up-going pressure field of the dual sensor data before processing by the method of the invention.

The basis for comparison of the dual sensor SRME method are NMO stacked sections. FIG. 2 shows a NMO stack of the up-going pressure field of the dual sensor data before processing by the method of the invention. Some first order surface related multiples are indicated at reference numeral 21. In order to apply the method of the invention to dual sensor towed streamer data, two different wave fields for free-surface multiple prediction were used: the up-going pressure field of the original data and the down-going velocity field, as indicated in Equations (4) and (5). The down-going velocity field was extrapolated from the receiver level backward to the source level. The predicted multiples were subsequently subtracted from the up-going pressure field using an adaptive least square subtraction.

Figure 3:
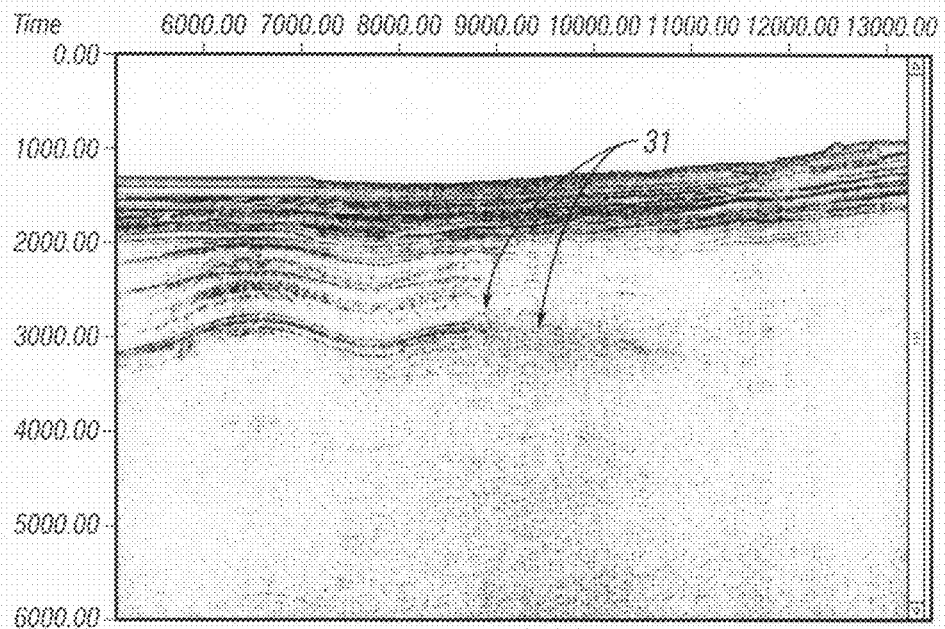
FIG. 3 is the NMO stack of the dual sensor data processed by the method of the invention.
Figure 4:
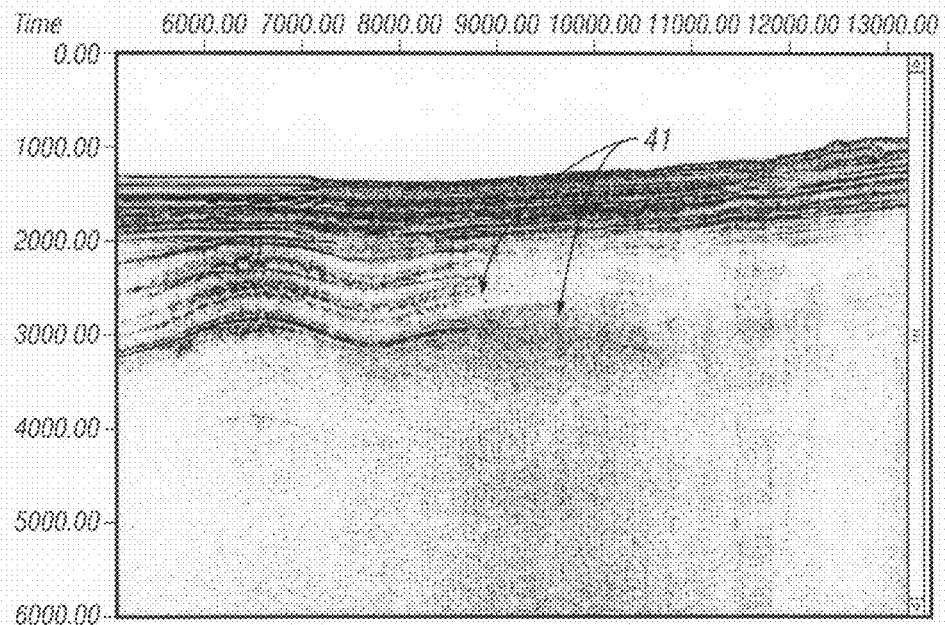
FIG. 4 is a the NMO stack of the conventional streamer data processed by conventional means.

The application result of the method of the invention is shown in FIGS. 3 and 4 in comparison to the conventional streamer SRME. FIG. 3 shows the NMO stack of the dual sensor data processed by the method of the invention. FIG. 4 shows the NMO stack of the conventional streamer data processed by conventional means. Due to a more reliable free-surface multiple prediction, the multiples are better suppressed in the dual sensor towed streamer approach and primaries consequently better preserved. For example, the first order surface related multiples indicated at 21 in FIG. 2 are somewhat suppressed at 41 in FIG. 4 by conventional processing, but are much better suppressed at 31 in FIG. 3, due to application of the method of the invention.

The invention is a method for towed dual sensor streamer SRME. The acquired total pressure field and total vertical velocity field are separated into up- and down-going fields at the receiver depth level. The down-going velocity field is used together with the pressure field for free-surface multiple prediction. An adaptive least square subtraction from the up-going pressure field leads to a free-surface substantively multiple-free up-going pressure. Due to the usage of the down-going velocity field, this method results in more reliable attenuation of the multiples by implicitly introducing the sea-surface variations into the multiple prediction process. Thus, the method of the invention can properly handle the fluctuations in the sea surface and reflection coefficient.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for processing seismic data from a towed marine seismic streamer having particle motion sensors and pressure sensors, comprising:

combining the particle motion sensor signals and the pressure sensor signals to generate an up-going pressure wavefield component and a down-going particle motion wavefield component;

extrapolating the down-going particle motion wavefield component from a receiver position depth level to a source position depth level;

multiplying the up-going pressure wavefield component by the extrapolated down-going particle motion wavefield component in a space-frequency domain, generating a first product;

iteratively calculating $n^{th}$ order surface related multiples in the pressure wavefield utilizing a product of $(n-1)^{th}$ surface related multiple free pressure wavefield and the extrapolated down-going particle motion wavefield component; and iteratively subtracting the calculated $n^{th}$ order surface related multiples from the recorded pressure wavefield, generating the $n^{th}$ order surface related multiple free pressure wavefield.

2. The method of claim 1, wherein the combining the particle motion sensor signals and the pressure sensor signals comprises:

scaling signals detected by the particle motion sensors to match signals detected by the pressure sensors;

combining the scaled particle motion sensor signals and the pressure sensor signals to generate an up-going pressure wavefield component;

scaling signals detected by the pressure sensors to match signals detected by the particle motion sensors; and combining the particle motion sensor signals and the scaled pressure sensor signals to generate a down-going particle motion wavefield component.

3. The method of claim 2, wherein the combining the particle motion sensor signals and the pressure sensor signals comprises the initial steps of:
sorting the particle motion sensor signals into common source gathers; and
sorting the pressure sensor signals into common receiver gathers.

4. The method of claim 1, wherein the iteratively calculating and iteratively subtracting comprises:
setting a multiple order index n equal to 1;
calculating $n^{th}$ order surface related multiples utilizing the first product;
subtracting the calculated $n^{th}$ order surface related multiples from the pressure sensor signal, generating the $n^{th}$ order surface related multiple free data;
determining if multiples in the $n^{th}$ order surface related multiple free data are sufficiently attenuated;
multiplying the $n^{th}$ order surface related multiple free data by the extrapolated down-going particle motion wavefield component, generating a product;
increasing the multiple order index n by 1 to n+1;
repeating the calculating, subtracting, determining, multiplying, and increasing steps.

5. The method of claim 1, wherein the particle motion sensor is a vertical velocity sensor.

6. The method of claim 4, wherein the calculating $n^{th}$ order surface related multiples comprises applying the following equation:

$$p_n(x_r, \omega; x_s) = -\frac{i\omega}{s(\omega)} \int dS(\chi) p_{n-1}(\chi, z_s, \omega; x_r) \tilde{v}_z^d(\chi, z_s, \omega; x_s),$$

where $p_n(x_r, \omega, x_s)$ is the $n^{th}$ order surface related multiples, $p_{n-1}(\chi, z_s, \omega, x_r)$ is the $(n-1)^{th}$ order surface related multiple free data, $x_r = (x_r, y_r, z_r)$ is the receiver position in Cartesian coordinates, $x_s = (x_s, y_s, z_s) = (\chi, z_s)$ is the source position, $\omega$ is angular frequency, $s(\omega)$ is a source signature, and $$\tilde{v}_z^d(\chi, z_s, \omega; x_s) = \int_{-\infty}^{+\infty} dk v_z^d(k, z_r, \omega; x_s) \exp\{-ik_z(z_r - z_s)\} \exp\{ik\chi\}$$

where $v_z^d(k, z_r, \omega, x_s)$ is a down-going vertical velocity wavefield component in a frequency-wavenumber domain and $k=(k_x, k_y)$ are horizontal wavenumbers in x and y directions.

* * * * *